United States Patent

Satoh et al.

[11] Patent Number: 5,142,919
[45] Date of Patent: Sep. 1, 1992

[54] MAGNETOSTRICTION TYPE STRESS DETECTOR

[75] Inventors: Hiroshi Satoh; Yoshihiko Utsui; Katsuhiko Honda; Masahiko Hasegawa, all of Amagasaki, Japan

[73] Assignee: Mitsubishi Denki Kabushiki Kaisha, Tokyo, Japan

[21] Appl. No.: 527,805

[22] Filed: May 24, 1990

[30] Foreign Application Priority Data

| May 29, 1989 | [JP] | Japan | 1-135203 |
| May 29, 1989 | [JP] | Japan | 1-135204 |
| May 31, 1989 | [JP] | Japan | 1-137940 |
| Dec. 22, 1989 | [JP] | Japan | 1-333924 |

[51] Int. Cl.$^5$ .............................................. G01L 3/02
[52] U.S. Cl. .............................................. 73/862.333
[58] Field of Search .................... 73/779, 862.36; 324/209

[56] References Cited

U.S. PATENT DOCUMENTS

| 3,861,206 | 1/1975 | Kawafune et al. | |
| 4,414,855 | 11/1983 | Iwasaki | |
| 4,784,003 | 0/1988 | Kimura et al. | |
| 4,823,617 | 4/1989 | Hase et al. | 73/862.36 |
| 4,823,620 | 4/1989 | Edo et al. | 73/862.36 |
| 5,022,275 | 6/1991 | Satoh et al. | 73/862.36 |

FOREIGN PATENT DOCUMENTS 3624846 6/1988 Fed. Rep. of Germany .
1369404 7/1974 United Kingdom .

OTHER PUBLICATIONS

IEEE Transactions on Magnetics vol. MAG-20, No. 5, 1984, pp. 951-53.

Primary Examiner—Michael Razavi
Assistant Examiner—Elizabeth L. Shopbell
Attorney, Agent, or Firm—Sughrue, Mion, Zinn, Macpeak and Seas

[57] ABSTRACT

A magnetostriction type stress detector including a passive member to which an external force is applied, which passive member is formed of a magnetic material; a magnetic shielding member provided around the passive member, which magnetic shielding member is formed with a plurality of slits; and a detection coil provided around the magnetic shielding member for detecting a change in magnetic permeability due to a stress in the passive member to be generated by the external force, through the slits of the magnetic shielding member.

6 Claims, 8 Drawing Sheets

FIGURE 3(b)  FIGURE 3(a)
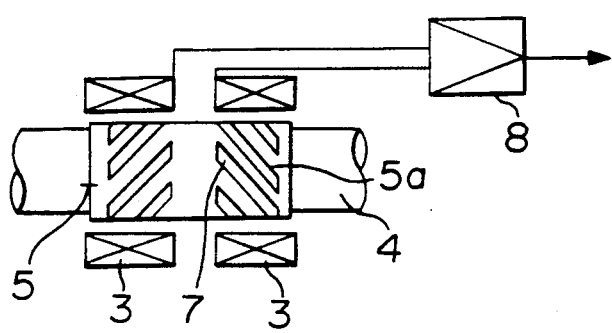
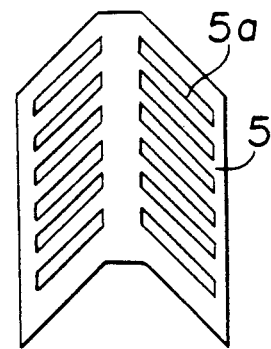
FIGURE 4
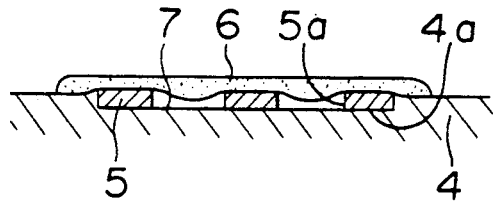
FIGURE 5
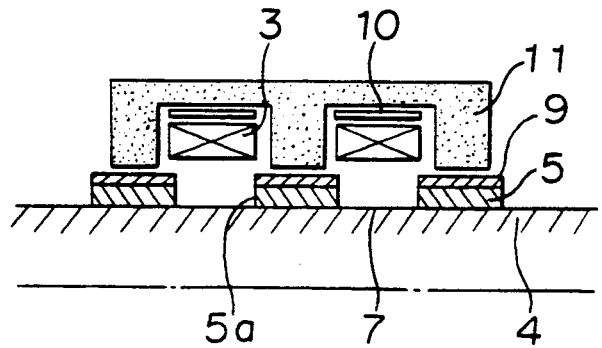

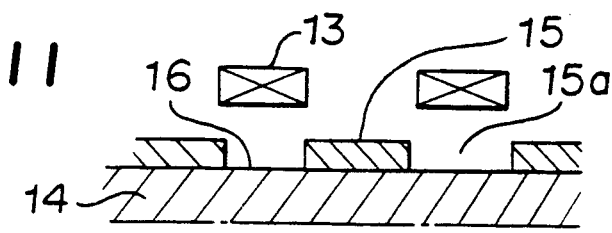
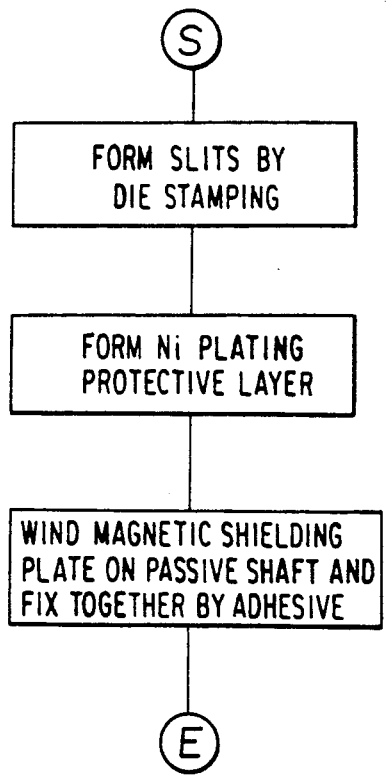
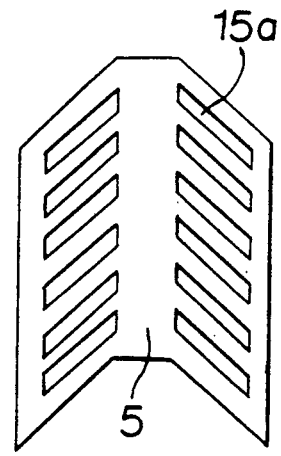
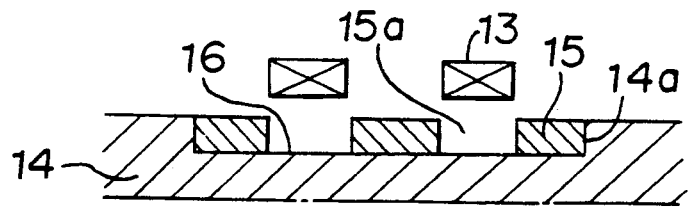
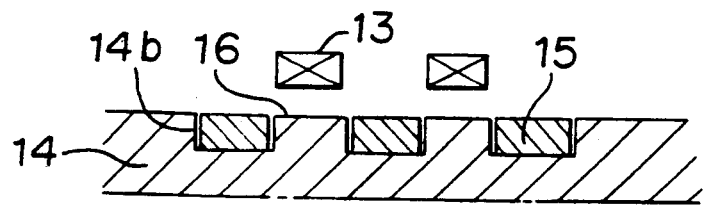

FIGURE 19(a)
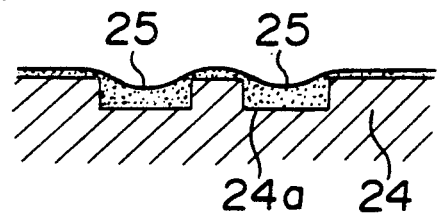
FIGURE 19(b)
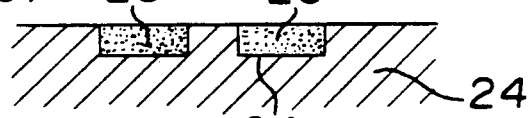
FIGURE 19(c)
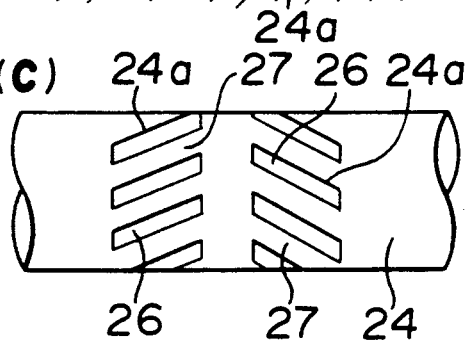
FIGURE 19(c')
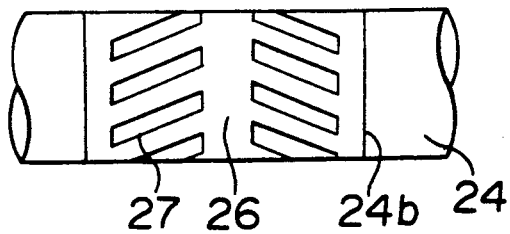
FIGURE 19(d)
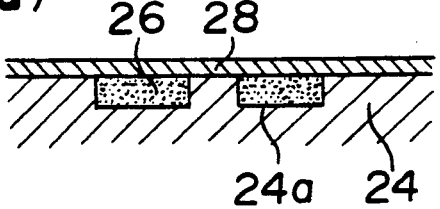

MAGNETOSTRICTION TYPE STRESS DETECTOR

BACKGROUND OF THE INVENTION

1. Field of the Invention

The present invention relates to a magnetostriction type stress detector to be used for measurement control of a robot motor having a drive shaft or an automotive engine.

2. Discussion of Background

FIG. 2 shows a construction of a conventional magnetostriction type stress detector as described in Japanese Unexamined Patent Publication No. 211030/1982, for example. Referring to FIG. 2, a reference numeral 1 designates a passive shaft to which a torque is applied, and a reference numeral 2 designates a pair of magnetic layers fixed to an outer circumference of the passive shaft 1. Each of the magnetic layers 2 is formed of a magnetic material having a high magnetic permeability and a soft magnetism, and it is constructed of a plurality of strip-like elements. The two magnetic layers 2 are arranged symmetrically with each other, and are inclined at ±45°. A numeral 3 designates a pair of detection coils provided around the magnetic layer 2.

In operation, when a torque is applied to the passive shaft 1, a stress is generated in the magnetic layers 2 with respect to a principal axis of strain in a longitudinal direction thereof. This stress operates as an extension force in one of the magnetic layers 2, while operating as a compression force in the other. Accordingly, there is generated a change in magnetic permeability between the two magnetic layers 2. In the case that a constant of magnetostriction is positive, the magnetic permeability is increased when the extension force is applied, while being decreased when the compression force is applied. In the case that the constant of magnetostriction is negative, the above relationship is reversed. The detection coils 3 serve to generate a magnetic flux which penetrates into the magnetic layers 2 to detect a change in magnetic permeability of the magnetic layers 2 as a change in magnetic impedance, thereby detecting the stress. As the outputs from the detection coils 3 are different in polarity from each other, a differential value of the outputs is obtained as a large output.

However, there is a large difference in the coefficient of linear expansion between the passive shaft 1 and the magnetic layers 2 which causes the generation of a thermal stress in the magnetic layers 2. The thermal stress overlaps the stress to be measured, so that precise measurement of the stress cannot be conducted. To solve this problem, it has been proposed that the passive shaft is formed of a magnetic material having a high magnetic permeability and a soft magnetism, and a magnetic shielding the layer for shielding penetration of a magnetic flux by its magnetic skin effect is selectively formed on the passive shaft, while the magnetic layers are formed on a portion of the passive shaft where the magnetic shielding layer is not formed. In this conventional proposed technique, as the passive shaft and the magnetic layers are formed of the same material, the generation of a thermal stress is prevented to thereby conduct precise measurement of the stress.

However, in the above-mentioned prior art stress detector including the passive shaft and the magnetic layers formed of the same material, much time and labor are required for the selective formation of the magnetic shielding layer on the passive shaft, causing an increase in cost and no possibility of mass production. Furthermore, as the magnetic shielding layer is fixed to the passive shaft, there is a possibility of a thermal stress being generated due to a difference in the coefficient of linear expansion between the magnetic shielding layer and the passive shaft, resulting in a detection error.

SUMMARY OF THE INVENTION

It is an object of the present invention to provide a magnetostriction type stress detector which can be manufactured at a low cost with an improved mass productivity and can exhibit a good temperature characteristic.

According to one aspect of the present invention, there is provided a magnetostriction type stress detector comprising a passive member to which an external force is applied, said passive member being formed of a magnetic material; a magnetic shielding member provided around said passive member, said magnetic shielding member being formed with a plurality of slits; and a detection coil provided around said magnetic shielding member for detecting a change in magnetic permeability due to a stress in said passive member to be generated by said external force, through said slits of said magnetic shielding member.

According to another aspect of the present invention, there is provided a method of manufacturing a magnetostriction type stress detector, comprising the steps of forming a passive shaft to which an external force is applied, from a magnetic material having a high magnetic permeability and a soft magnetism; forming a slit for allowing passage of a magnetic flux through a magnetic shielding plate formed of a nonmagnetic material having a high conductivity; winding said magnetic shielding plate around said passive shaft; fixing said magnetic shielding plate to said passive shaft to form a magnetic layer on a portion of said passive shaft corresponding to said slit; and locating around said magnetic layer a detection coil for detecting a change in magnetic permeability due to a stress in said magnetic layer to be generated by said external force.

According to a further aspect of the present invention, there is provided a method of manufacturing a magnetostriction type stress detector, comprising the steps of forming a passive shaft to which an external force is applied, from a magnetic material having a high magnetic permeability and a soft magnetism; selectively forming a plurality of recesses on said passive shaft; immersing said passive shaft in a solder bath containing a nonmagnetic material having a high conductivity to fill said recesses with a solder of said nonmagnetic material and fix said solder in said recesses; removing an extra part of said solder deposited on said passive shaft to form a plurality of magnetic shielding layers in said recesses and also form a magnetic layer between adjacent ones of said magnetic shielding layers; and locating around said magnetic layer a detection coil for detecting a change in magnetic permeability due to a stress in said magnetic layer to be generated by said external force.

Other objects and features of the invention will be more fully understood from the following detailed description and appended claims when taken with the accompanying drawings.

BRIEF DESCRIPTION OF THE DRAWINGS

FIG. 3a is a perspective view of the magnetic shielding layer in the first embodiment;

FIG. 3b is a schematic plan view of the first embodiment connected to a differential amplifier;

FIG. 4 is a sectional view of the magnetostriction type stress detector according to a second embodiment of the present invention;

FIG. 5 is a sectional view of the magnetostriction type stress detector according to a third embodiment of the present invention;

FIG. 11 is a sectional view of the magnetostriction type stress detector according to a sixth embodiment of the present invention;

FIG. 12 is a flowchart of a manufacturing process of the magnetostriction type stress detector according to the sixth embodiment;

FIG. 13 is a perspective view of the magnetic shielding plate according to the sixth embodiment;

FIG. 14 is a sectional view of the magnetostriction type stress detector according to a seventh embodiment of the present invention;

FIG. 15 is a sectional view of the magnetostriction type stress detector according to an eighth embodiment of the present invention;

FIGS. 19a to 19d are illustrations of the steps of manufacturing the magnetostriction type stress detector according to a tenth embodiment of the present invention;

DETAILED DESCRIPTION OF THE PREFERRED EMBODIMENTS

Figure 1:
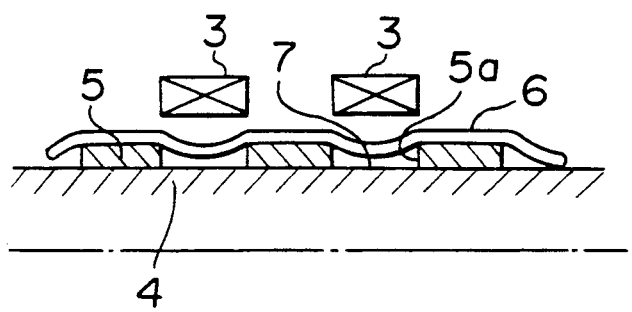
FIG. 1 is a sectional view of the magnetostriction type stress detector according to a first embodiment of the present invention.

There will now be described some preferred embodiments of the present invention with reference to the drawings. Referring to FIG. 1 which is a sectional view of a magnetostriction type stress detector according to a first embodiment of the present invention, a reference numeral 4 designates a passive shaft or a passive member formed of a magnetic material having a high magnetic permeability and a soft magnetism such as PB permalloy and PE permalloy. A numeral 5 designates a magnetic shielding layer formed of a nonmagnetic material having a high conductivity such as copper or aluminum. As shown in FIGS. 3a and 3b, the magnetic shielding layer 5 is formed with a plurality of so-called chevron-like slits 5a inclined at ±45° relative to the passive shaft 4, and is wound around the passive shaft 4. A numeral 6 designates a thermal shrinking tube formed of plastics for pressing the magnetic shielding layer 5 from an outer circumference thereof so as to dispose the same in contact with or in the proximity of the passive shaft 4 under an unbonded condition. A numeral 7 designates a plurality of magnetic layers or strips formed or defined at portions of the passive shaft 4 corresponding to the slits 5a. A pair of detection coils 3 are provided around the magnetic layers 7, and outputs from the detection coils 3 are differentially amplified by a differential amplifier 8.

The magnetic shielding layer 5 exhibits a magnetic skin effect to hinder the penetration of a magnetic flux generated by the detection coils 3. The magnetic layers 7 are formed at the portions of the passive shaft 4 corresponding to the slits 5a of the magnetic shielding layer 5. The detection coils 3 detect a change in magnetic permeability due to a stress in the magnetic layers 7. As the outputs from the detection coils 3 are different in polarity from each other, they are differentially amplified by the differential amplifier 8 to obtain a large output.

As mentioned above, the magnetic shielding layer 5 is wound around the passive shaft 4, and is pressed on the outer circumference thereof by the thermal shrinking tube 6, thus forming the magnetic layers 7 on the passive shaft 4. Accordingly, the manufacturing process can be simplified to thereby reduce the manufacturing time and cost and improve the mass productivity. Further, since the magnetic shielding layer 5 is not bonded to the passive shaft 4, direct application of the stress to the magnetic shielding layer 5 can be prevented to thereby suppress any deformation of the magnetic shielding layer 5, and further there is no possibility of a thermal stress being generated due to a difference in coefficient of linear expansion between the magnetic shielding layer 5 and the passive shaft 4 to thereby improve the detection accuracy. The thermal shrinking tube 6 functions not only to press and hold the magnetic shielding layer 5 but also to protect the magnetic shielding layer 5 and the magnetic layers 7.

Referring to FIG. 4 which shows a second embodiment of the present invention, a circumferential recess 4a is formed in the outer circumference of the passive shaft 4, and the magnetic shielding layer 5 is received in the circumferential recess 4a and wound around the bottom of the recess 4a. The thermal shrinking tube 6 is fitted with the passive shaft 4 so as to press the magnetic shielding layer 5. With this construction, the magnetic shielding layer 5 can be easily positioned. The other effects are the same as the of the first preferred embodiment.

Referring to FIG. 5 which shows a third embodiment of the present invention, three presser rings are hot press-fitted over the outer circumference of the magnetic shielding layer 5 so as to dispose the same in contact with or in the proximity of the passive shaft 4 under the unbonded condition. A pair of circular yokes 10 are provided around the outer circumferences of the detection coils 3, respectively, and function to converge the magnetic flux generated from the detection coils 3. A shield 11 having a sectional E-shaped configuration is provided around the outer circumferences of the yokes 10, and functions to shield inside and outside magnetisms by a magnetic skin effect. The rings 9 may be formed of a nonmagnetic material so that they may also function as a part of the shield. The operation and effect are similar to those of the first preferred embodiments.

Figure 6:
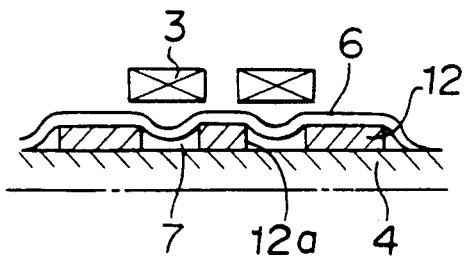
FIG. 6 is a sectional view of the magnetostriction type stress detector according to a fourth embodiment of the present invention.
Figure 8A:
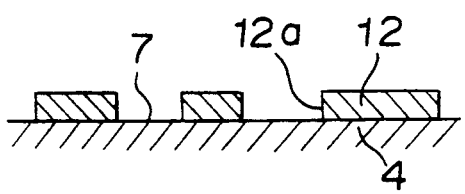
FIGS. 8a and 8b are illustrations of formation of the magnetic la according to the fourth embodiment.
Figure 8B:
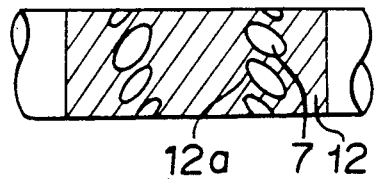
Figure 7:
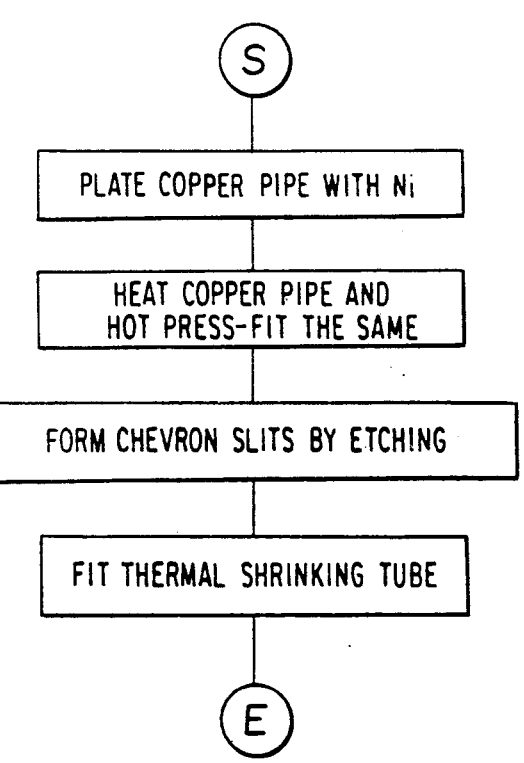
FIG. 7 is a flowchart of a manufacturing process of the magnetostriction, type stress detector according to the fourth embodiment.

Referring to FIGS. 6 and 7 which show a fourth embodiment of the present invention, a magnetic shielding layer 12 formed of a copper plate is electrolessly plated with Ni, and is then hot press-fitted with the outer circumference of the passive shaft 4. Then, the magnetic shielding layer 12 is partially cut by etching, machining, laser beam, electron beam, etc. to form a plurality of chevron-like slits 12a. As a result, the magnetic layers 7 are formed at portions of the passive shaft 4 corresponding to the slits 12a. Such a condition is shown in FIGS. 8a and 8b. Then, the thermal shrinking tube 6 as a protective layer is provided surrounding the magnetic shielding layer 12. The detection coils 3 are provided in the same manner as the first embodiment. The operation and effect are similar to those of the first embodiment.

Figure 9:
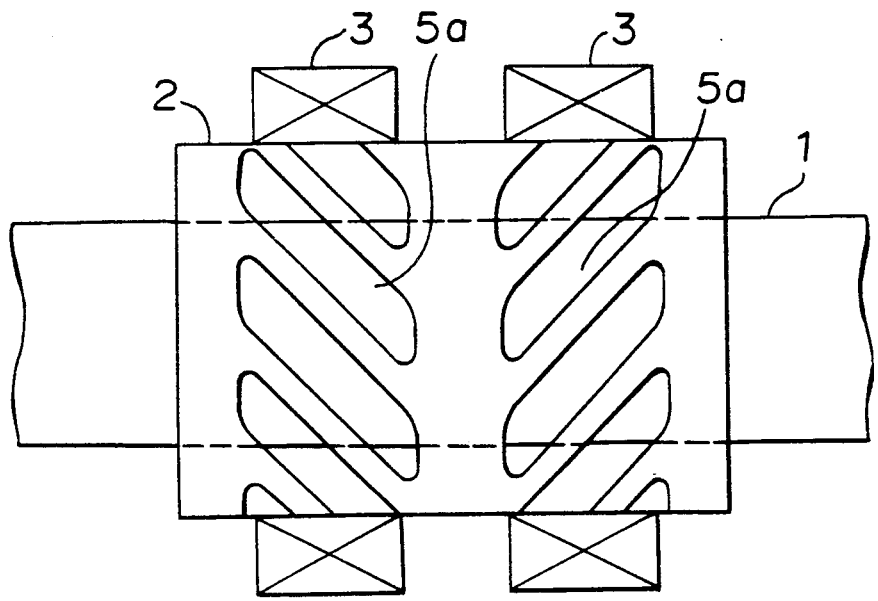
FIG. 9 is a schematic plan view of the magnetostriction type stress detector according to a fifth embodiment of the present invention.

Referring to FIG. 9 which shows a fifth embodiment of the present invention, the construction is the same as that of the first embodiment except that the thermal shrinking tube is not provided, and the detection coils 3 are directly provided on the magnetic shielding layer 5 in such a manner as to be exposed to the slits 5a. The operation and effect are similar to those of the first embodiment.

The principle of operation of the detector according to the fifth embodiment will now be described.

Figure 10:
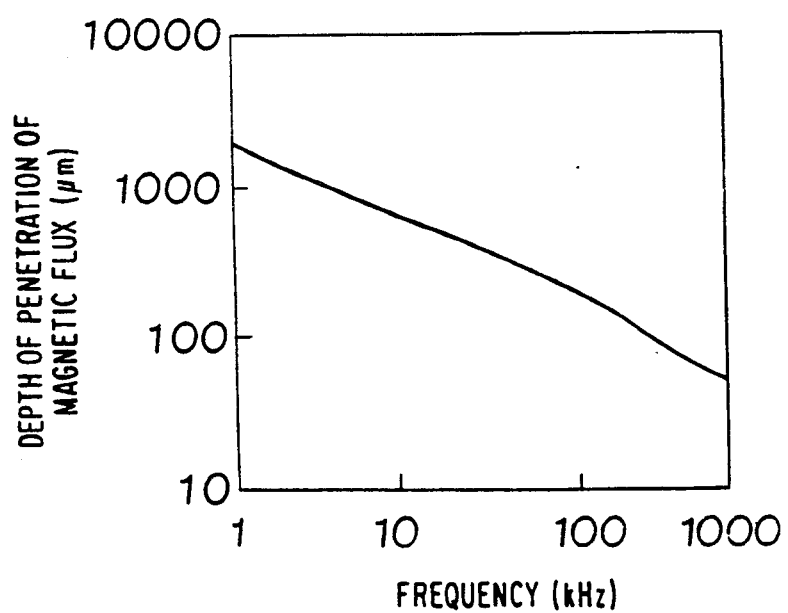
FIG. 10 is a characteristic graph showing a depth $\delta$ of penetration of a magnetic flux in the case of forming the magnetic shielding layer from Cu according to the fifth embodiment.

When a high-frequency current is supplied to the detection coils 3, the detection coils 3 generate a high-frequency magnetic flux. Considering the density of the magnetic flux on a conductor surface, the density is attenuated in accordance with $\exp(-\sqrt{\omega\sigma\mu/2})$ where $\omega$, $\sigma$ and $\mu$ represent the frequency of the magnetic flux, the conductivity of the conductor and the magnetic permeability of the conductor, respectively. Accordingly, the depth $\delta$ of penetration of the magnetic flux is represented by $\delta = \sqrt{\omega\sigma\mu}$. As the conductivity $\sigma$ of the magnetic shielding layer 5 is large, the depth $\delta$ of penetration is small. In the case that the magnetic shielding layer 5 is formed of Cu, the depth $\delta$ of penetration is about $\delta = 250$ $\mu$m at the frequency of 50 kHz as shown in FIG. 10. Accordingly, by setting a thickness of the magnetic shielding layer 5 to be greater than the value $\delta$, the magnetic flux can be prevented from penetrating into a portion of the passive member 1 covered with the magnetic shielding layer 5, and the magnetic flux is allowed to penetrate into the slits 5a only. When an external force such as a torque is applied to the passive member 1, there is generated a distortion in the passive member 1 to cause a change in magnetic permeability and accordingly cause a change in magnetic impedance with respect to the magnetic flux. As a result, the outputs from the detection coils 3 are changed, and a distortion quantity can be measured according to a degree of the change in the outputs from the two coils 3.

As the magnetic shielding layer 5 is not bonded to the passive member 1, there is no possibility of a thermal stress being generated due to a difference in coefficient of linear expansion between the magnetic shielding layer 5 and the passive member 1, thus improving the detection accuracy. Further, as the magnetic shielding layer 5 is fixed to the detection coils 3, the manufacturing process can be simplified as compared with the prior art distortion measuring device wherein the magnetic shielding layer is mounted on the passive member 1.

Although the strip-like slits 5a are provided in the above embodiment, the slits 5a are not limited in shape and number to the above but they may be decided according to a performance and a function of the distortion measuring device.

Further, although the magnetic shielding layer 5 is formed of Cu in the above preferred embodiment, any other nonmagnetic or diamagnetic material having a high conductivity such as Au, Al, Ag and Pt may be employed.

Alternatively, the magnetic shielding layer 5 may be formed of a high-temperature superconducting material such as Nb-Ti, Nb$_3$Si, Ba-Y-Cu-0, Sc-Sr-Cu-O and La-Ba-Cu-O superconducting material. Since the superconducting material is capable of shielding magnetism by a diamagnetic effect, i.e., a Meissner effect, the depth of penetration of the magnetic flux is $\delta = 0$, and the thickness of the magnetic shielding layer 5 can be therefore greatly reduced. Thus, the performance can be improved, and the size can be reduced. Further, in the case of requiring a mechanical strength to some extent, a coating of the high-temperature superconducting material may be formed on a surface of the other material.

Although the magnetic shielding layer 5 is bent to form a cylindrical shape in the above embodiment, it may be formed into any shapes in correspondence with shapes of an object to be measured.

Further, when a gap between the passive member 1 and the magnetic shielding layer 5 is set to 1 mm or less, the magnetic flux is more effectively penetrated into the passive member 1 to result in improved in measurement accuracy.

According to the above-mentioned embodiments, magnetic shielding layer having slits is provided around the passive shaft in contact therewith or in the proximity thereof under an unbonded condition, so that the magnetic layers are formed on the portions of the passive shaft corresponding to the slits. Accordingly, the detector can be manufactured easily at a low cost, and the mass productivity can be improved. Further, as the magnetic shielding layer is not bonded to the passive shaft, there is no possibility of a thermal stress being generated due to a difference in the coefficient of linear expansion between the magnetic shielding layer and the passive shaft, thereby preventing a detection error.

Referring next to FIGS. 11 to 13 which show a sixth embodiment of the present invention, a passive shaft or passive member 14 is formed of a magnetic material having a high magnetic permeability and a soft magnetism such as PB$_2$ permalloy, PE permalloy, pure iron, iron and pure nickel. Then, a copper blank plate is stamped by a die to form a magnetic shielding plate 15 having a plurality of slits 15a as shown in FIG. 13.

Figure 2:
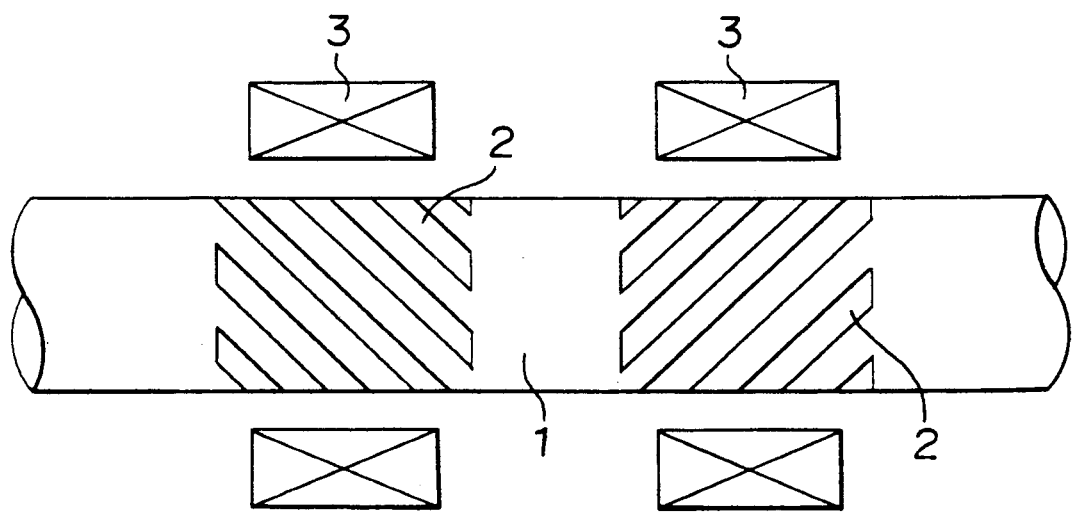
FIG. 2 is a schematic plan view of the magnetostriction type stress detector in the prior art.

Then, an electroless Ni plating (nonmagnetic) as a protective layer is formed on the magnetic shielding plate 15. Then, the magnetic shielding plate 15 is wound around the passive shaft 14, and is fixed thereto by adhesive. As a result, a plurality of magnetic layers 16 each having a shape similar to that shown in FIG. 2 are formed on exposed portions of the passive shaft 14 corresponding to the slits 15a, and a pair of detection coils 13 are provided surrounding the magnetic layers 16.

The magnetic shielding plate 15 exhibits a magnetic skin effect to hinder penetration of magnetic flux generated by the detection coils 13. The magnetic layers 16 are formed at the exposed portions of the passive shaft 14 corresponding to the slits 15a of the magnetic shielding plate 15. A stress in the passive shaft 14 can be detected by detecting a change in magnetic permeability of the magnetic layers 16 with the use of the detection coils 13. The formation of the magnetic layers 16 is easily carried out by winding the magnetic shielding plate 15 having the slits 15a around the passive shaft 14 and fixing the magnetic shielding plate 15 to the passive shaft 14. Thus, the detector can be manufactured at a low cost with an improved mass productivity. Further, as the passive shaft 14 is formed of a magnetic material having a high magnetic permeability and a soft magnetism, magnetization of the passive shaft 14 is suppressed to obtain a large magnetostriction of the magnetic layers 16.

Referring to FIG. 14 which shows a seventh embodiment of the present invention, a circumferential recess 14a is formed on the outer circumference of the passive shaft 14 by cutting, and the magnetic shielding plate 15 having the slits 15a is received in the circumferential recess 14a and would on the bottom of the recess 14a. Then, the magnetic shielding plate 15 is fixed to the bottom of the recess 14a. With this construction, the magnetic shielding plate 15 is hardly damaged, and it is easily positioned by being restricted in the recess 14a.

Figure 16:
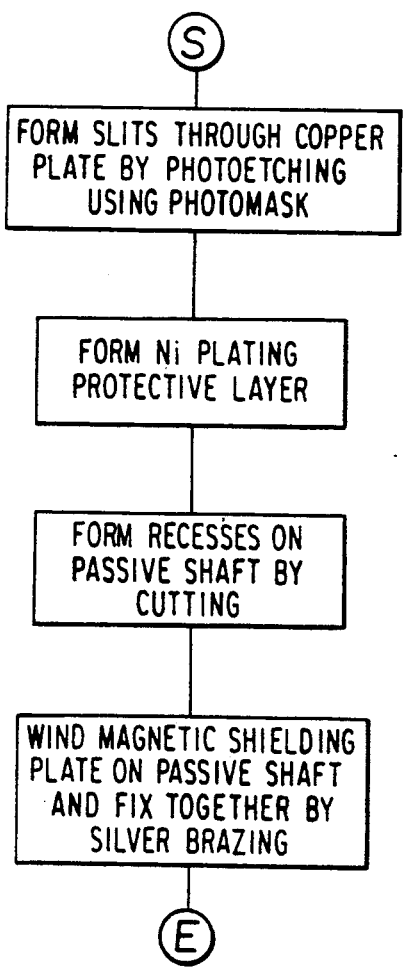
FIG. 16 is a flowchart of a manufacturing process of the magnetostriction type stress detector according to the eighth embodiment.

Referring to FIGS. 15 and 16 which show an eighth embodiment of the present invention, a copper blank plate is etched by a photoetching process using a photomask to form the magnetic shielding plate 15 having the slits 15a. In this case, copper (I) chloride solution is used as an etching solution. Then, an electroless nickel plating as a protective layer is formed on the magnetic shielding plate 15. Then, a plurality of recesses 14b are formed on the outer circumference of the passive shaft 14 by cutting, so that peripheral portions of the slits 15a of the magnetic shielding plate 15 may be received in the recesses 14b. Then, the magnetic shielding plate 15 is wound around the passive shaft 14 in such a manner that the peripheral portions of the slits 15a are received in the recesses 14b, and is then fixed to the passive shaft 14 by silver brazing. With this construction, an outer surface of each magnetic layer 16 is made flush with an outer surface of the magnetic shielding plate 15. The operation and effect are similar to those of the above embodiment.

Figure 18:
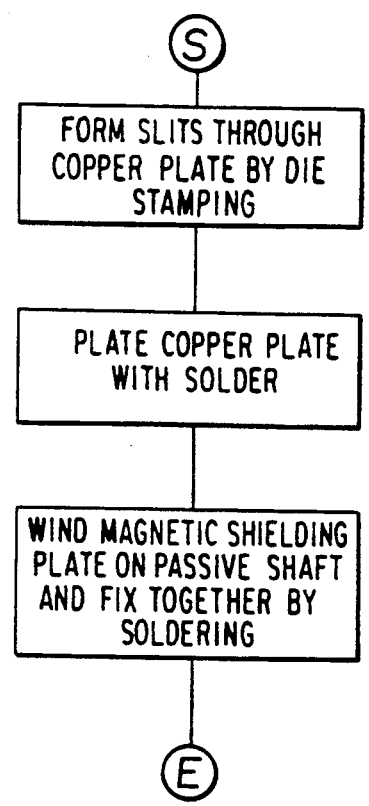
FIG. 18 is a flowchart of a manufacturing process of the magnetostriction type stress detector according to the ninth embodiment.
Figure 17:
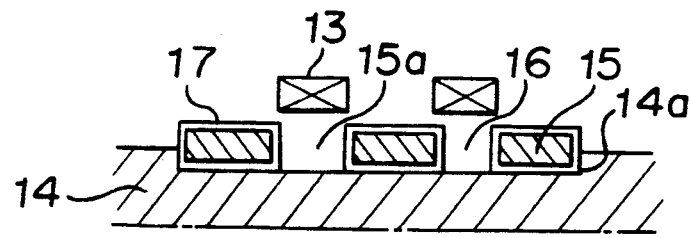
FIG. 17 is a sectional view of the magnetostriction type stress detector according to a ninth embodiment of the present invention.
Figure 20:
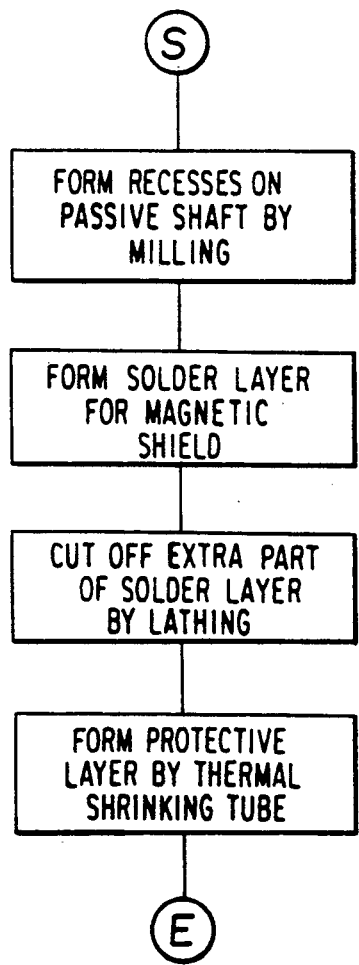
FIG. 20 is a flowchart of a manufacturing process of the magnetostriction type stress detector according to the tenth embodiment.

Referring to FIGS. 17 and 18 which show a ninth embodiment of the present invention, a copper blank plate is stamped by a die to form the magnetic shielding plate 15 having the slits 15a. Then, the magnetic shielding plate 15 is plated with a solder to form a solder plating layer 17. Then, the magnetic shielding plate 15 is received in the recess 14a formed on the outer circumference of the passive shaft 14, and is wound around the bottom of the recess 14a. Then, the magnetic shielding plate 15 is soldered through the solder plating layer 17 to the passive shaft 14. Thus, the magnetic layers 16 are formed. In this embodiment, the solder plating layer 17 exhibits two functions of protection and fixation of the magnetic shielding plate 51. The outer effects are similar to those of the above embodiment.

Although the magnetic shielding plate 15 is formed of copper in the above sixth to ninth embodiments, any other nonmagnetic materials having a high conductivity such as aluminum, gold, platinum and silver may be employed for the magnetic shielding plate 15. Further, although the fixation of the magnetic shielding plate 15 to the passive shaft 14 is carried out by adhesion, soldering or blazing in the above embodiments, the fixation may be carried out by welding or ultrasonic pressure welding. Further, although the recesses 14a and 14b of the passive shaft 14 are formed by cutting in the above embodiments, they may be formed by etching. Further, a thermal shrinking tube formed of plastics as a protective layer for the magnetic shielding plate 15 may be provided on the outer circumference of the magnetic shielding plate 15.

According to the above sixth to ninth embodiments, the magnetic shielding plate having the slits is wound around the passive shaft, and is fixed thereto, so that the magnetic layers are formed. Accordingly, the formation of the magnetic layers can be easily carried out, and the magnetostriction type stress detector can be manufactured at a low cost with an improved mass productivity. Further, in the case that the magnetic shielding plate is plated with a solder, the solder plating layer functions to both protect and fix the magnetic shielding plate, thereby easily obtaining the detector with a reliability. Further, in the case that the magnetic shielding plate is received in the recess formed on the outer circumference of the passive shaft, the protection and the positioning of the magnetic shielding plate can be easily effected.

Referring next to FIGS. 19a to 19d and 20 which show a tenth embodiment of the present invention, a passive shaft 24 is formed of a magnetic material having a high magnetic permeability and a soft magnetism such as permalloy (PE, PB), pure nickel and pure iron. A plurality of strip-like recesses 24a inclined at ±45° are formed on the outer circumference of the passive shaft 24 by milling (see FIG. 19a). Then, the passive shaft 24 is immersed into a solder bath containing a nonmagnetic material having a high conductivity such as Cu, Al, Au, Pt and Ag, so as to fill the recesses 24a with a solder 25 and fix the solder 25 in the recesses 24a. As the solder 25 is deposited onto the surface of the passive shaft 24 in addition to the recesses 24a at this time, an extra part of the solder 25 deposited on the surface of the passive shaft 24 is then removed off by lathing as shown in FIGS. 19b and 19c. Thus, a plurality of strip-like magnetic shielding layers 26 formed of the solder 25 are formed in the recesses 24a. At the same time, a plurality of the magnetic layers 27 inclined at ±45° are formed in such a manner that each magnetic layer 27 is formed between the adjacent ones of the strip-like magnetic shielding layers 26. Then, as shown in FIG. 19d, the circumferential surface of the passive shaft 24 including the outer surfaces of the magnetic shielding layers 26 is covered with a thermal shrinking tube formed of plastics to form a protective layer 28. Further, a pair of detection coils 3 are provided around the magnetic layers 27 in the same manner as the prior art.

The magnetic shielding layers 26 exhibit a magnetic skin effect to hinder penetration of magnetic flux generated by the detection coils 3, and each of the magnetic layers 27 is formed between the adjacent magnetic shielding layers 26. A stress of the magnetic layers 27 can be detected by detecting a change in magnetic permeability of the magnetic layers 27 by means of the detection coils. In this embodiment, the magnetic shielding layers 26 are formed by forming the recesses 24a on the passive shaft 24 and immersing the passive shaft 24 into the solder bath containing the nonmagnetic material having a high conductivity to fill the recesses 24a with the solder. Accordingly, the manufacturing process can be simplified, and the manufacturing time can be reduced to reduce the cost. Further, as the magnetic shielding layers 26 are formed by soldering, a strong structure can be obtained. Additionally, as the nonmagnetic protective layer 28 is formed, corrosion and damage of the magnetic shielding layers 26 and the magnetic layers 27 can be prevented. A modification of this embodiment is shown in FIG. 19c. In this modification, a recess 24b is formed on the passive shaft 24 at a portion other than the strip-like parts which will be formed as the magnetic layers 27 later. Then, the recess 24b is filled with a solder, and the solder is fixed in the recess 24b. Thus, the magnetic shielding layer 26 formed of the solder is formed in the recess 24b, and the magnetic layers 27 are formed at the strip-like portions.

Figure 21:
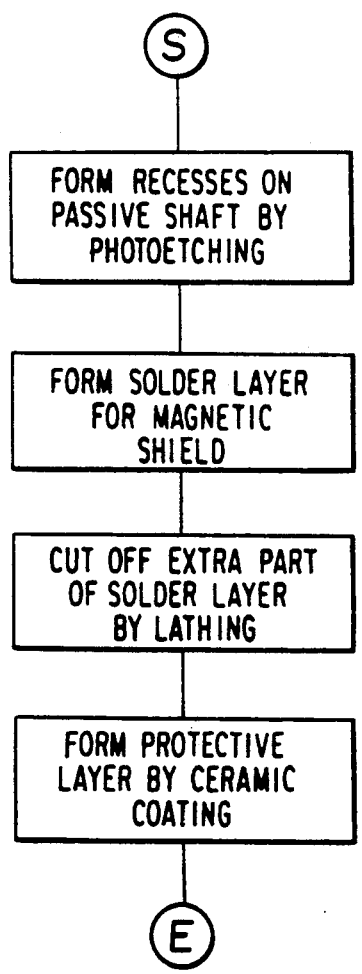
FIG. 21 is a flowchart of a manufacturing process of the magnetostriction type stress detector according to an eleventh embodiment of the present invention.

Referring to FIG. 21 which shows a manufacturing process of an eleventh embodiment of the present invention, the process is substantially the same as that of the tenth embodiment except that the formation of the recesses 24a of the passive shaft 4 is carried out by a photoetching process and the nonmagnetic protective layer 28 is formed by ceramic coating.

According to the above tenth and eleventh embodiments, the magnetic shielding layers and the magnetic layers can be easily formed, thereby simplifying the manufacturing process. Accordingly, the detector can be manufactured at a low cost with an improved mass productivity. Further, as the magnetic shielding layers are formed by soldering, a strong structure can be obtained.

While the invention has been described with reference to specific embodiments, the description is illustrative and is not to be constructed as limiting the scope of the invention. Various modifications and changes may occur to those skilled in the art without departing from the spirit and scope of the invention as defined by the appended claims.

What is claimed is:

1. A magnetostriction type stress detector, comprising: a passive member to which an external force is applied, said passive member being formed of a magnetic material; a magnetic shielding member provided around said passive member, said magnetic shielding member being formed with a plurality of slits; and a detection coil provided around said magnetic shielding member for detecting a change in magnetic permeability due to a stress in said passive member generated by said external force, through said slits of said magnetic shielding member, wherein said magnetic shielding member is located in contact with or in proximity to said passive member under an unbonded condition.

2. The magnetostriction type stress detector according to claim 1, wherein said magnetic shielding member is formed of a nonmagnetic or diamagnetic material having a high conductivity.

3. The magnetostriction type stress detector according to claim 1, wherein said passive member is formed at its outer circumference with a recess, and said magnetic shielding member is received in said recess.

4. A magnetostriction type stress detector, comprising: a passive member to which an external force is applied, said passive member being formed of a magnetic material; a magnetic shielding member provided around said passive member, said magnetic shielding member being formed with a plurality of slits; and a detection coil provided around said magnetic shielding member for detecting a change in magnetic permeability due to a stress in said passive member generated by said external force, through said slits of said magnetic shielding member, wherein said detection coil is fixed to an outer circumference of said magnetic shielding member.

5. The magnetostriction type stress detector according to claim 4, wherein said magnetic shielding member is formed of a nonmagnetic or diamagnetic material having a high conductivity.

6. A magnetostriction type stress detector, comprising: a passive member to which an external force is applied, said passive member being formed of a magnetic material; a magnetic shielding member provided around said passive member, said magnetic shielding member being formed with a plurality of slits; and a detection coil provided around said magnetic shielding member for detecting a change in magnetic permeability due to a stress in said passive member generated by said external force, through said slits of said magnetic shielding member, wherein said magnetic shielding member comprises a magnetic shielding plate coated with a solder plating, and said magnetic shielding plate is mounted on an outer circumference of said passive member by soldering.

* * * * *